United States Patent [19]

Month et al.

[11] 4,259,609

[45] Mar. 31, 1981

[54] PICK-UP TUBE HAVING LIGHT CONTROLLABLE FURCATED LIGHT PIPES

[75] Inventors: Alfred Month, Lancaster; Timothy E. Benner, Rohrerstown, both of Pa.

[73] Assignee: RCA Corp., New York, N.Y.

[21] Appl. No.: 952,999

[22] Filed: Oct. 20, 1978

[51] Int. Cl.[3] ........................ H01J 31/38; G02B 5/14

[52] U.S. Cl. .................................. 313/372; 350/96.10

[58] Field of Search ............... 313/371, 372, 474, 475; 350/96.10

[56] References Cited

U.S. PATENT DOCUMENTS

| | | | |
|---|---|---|---|
| 2,506,672 | 5/1950 | Kell et al. | 350/96.15 X |
| 3,217,292 | 11/1965 | Henderson | 350/96.1 X |
| 3,352,277 | 11/1967 | Schmidt | 350/96.1 X |
| 3,628,076 | 12/1971 | Weijland et al. | 313/372 |
| 3,751,703 | 8/1973 | Weijland et al. | 313/384 |
| 3,978,365 | 8/1976 | Limper | 313/372 |

*Primary Examiner*—Robert Segal
*Attorney, Agent, or Firm*—Eugene M. Whitacre; Dennis H. Irlbeck; Vincent J. Coughlin, Jr.

[57] ABSTRACT

A light conductor is utilized in a vidicon type pick-up tube to transmit light from a light source to the tube target for biasing the dark current of the target. The light conductor is preferably a bifurcated glass rod having a stem and two branches defining a crotch region. The light that is transmitted through the stem into the branches is selectively attenuated by filling in the crotch region with either glass redistributed from portions of the stem and branches or with additional glass. By controlling the light transmission with predetermined amounts of glass, the illumination and, hence, the dark current of the target can also be controlled.

6 Claims, 3 Drawing Figures

PICK-UP TUBE HAVING LIGHT CONTROLLABLE FURCATED LIGHT PIPES

BACKGROUND OF THE INVENTION

1. Field of the Invention

This invention relates to a pick-up tube and more particularly to a pick-up tube of the photoconductive target type that is light biased by a bifurcated light pipe.

2. Description of the Prior Art

Of the photoconductive image pick-up tubes, those using lead monoxide (PbO) as a main component of the photoconductive layer and those having their photoconductive layer composed mainly of selenium, arsenic and tellurium (Se, As, Te) have excellent image pick up qualities and are used often in broadcast cameras. However, these tubes also have a certain length of delay in rise or fall time, which delay adversely affects the reproduction of the original picture, particularly at low light levels. It should be here noted that the delay in the rise time, or build-up lag, is the interval of time from the instant that the light from the object falls upon the photoconductive layer to the instant that the photoelectric signal owing to the incident light is generated. The delay in the fall time, or decay lag, is the duration from the moment the incident light is interrupted to the moment the photoelectric signal due to the incident light vanishes.

In order to reduce the build-up and decay lags, it is known to increase the dark current level of the photoelectric signal by auxiliary illumination to add uniform light to the light from the object. This auxiliary illumination can be done by incorporating a weak light source in the tube or by utilizing the light from the filament of the tube cathode. By using a light conductor, this auxiliary light can be transferred, for example, to the collector space of the tube andfrom there distributed uniformly over the photoconductive layer by diffuse reflection.

As is known per se, the light conductor may consist of a glass rod which is suitably bent so that the light of a light source situated in front of one end of the rod emanates from the other end of the rod. Pick-up tubes incorporating such light conductors are shown in U.S. Pat. No. 3,628,076 to Weijland et al, issued on Dec. 17, 1971; U.S. Pat. No. 3,751,703 to Weijland et al, issued on Aug. 7, 1973; and U.S. Pat. No. 3,978,365 to Limper, issued on Aug. 31, 1976, which shows a bifurcated-type light conductor.

The light pipe must transmit enough light to be useful but should not transmit too much light so as to cause undue shading and other detectable uneven spurious signals. Often, variations in the photoconductive materials from tube to tube will necessitate different light intensities to obtain a desirable bias dark current. Also, the light transmission properties of the light pipes themselves may vary somewhat from pipe to pipe. Therefore, commercially available or standard "off the shelf" light pipes cannot often provide the light intensity that is required in view of these variations. Thus, it is desirable to have a light pipe that will account for such variations and produce a predetermined light transmission so that the required level of illumination and, hence, dark current may be consistently achieved.

SUMMARY OF THE INVENTION

A pick-up tube includes a photoconductive target electrode and a light source for illuminating the target electrode for biasing the dark current of the target electrode. A light conductor directs light from the light source to the target. The light conductor is of the type having a stem section and at least two branches defining a crotch portion between any two of the branches. Included in the light conductor is means for modifying the crotch portion to attenuate the light transmitted through the conductor, whereby a standard light conductor may have its light transmission properties altered to selectively provide a predetermined light intensity for obtaining a desirable, uniform dark current of the tube target.

DETAILED DESCRIPTION OF THE PREFERRED EMBODIMENT

Figure 1:
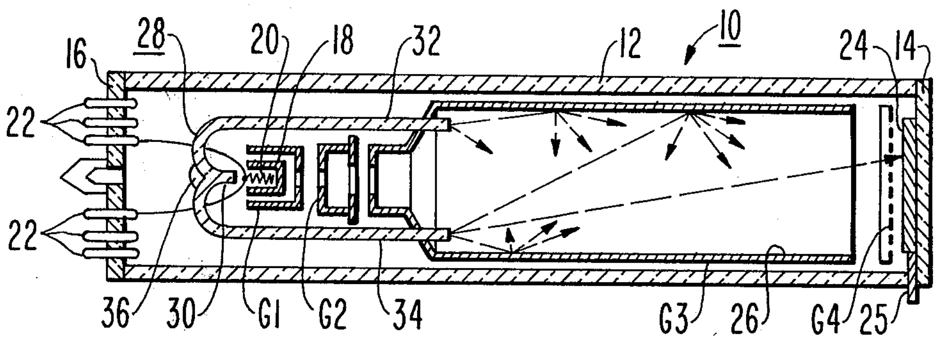
FIGS. 1 and 2 are elevation views partly in section of camera type pick-up tubes showing alternative light pipe configurations for bias lighting the tube target.

Referring to the drawing, there is shown in FIG. 1 a vidicon type pick-up tube 10 having a generally cylindrical glass envelope 12 closed at one end by a transparent glass faceplate 14 and at the other end by a transparent glass base plate 16. The interior of the enclosed envelope 12 is suitably evacuated.

The tube 10 comprises a cathode 18 which is heated by a filament 20, the filament being suitably connected to two of a plurality of lead pins 22 which are vacuum sealed through the base plate 16. G1, G2, and G4 are the normally provided electrodes known under those designations while G3 is the normally provided tubular anode electrode. A target 24 comprises a layer of lead monoxide deposited on a film of conductive tin oxide on the inside portion of the faceplate 14. An electrical contact may be made to the target 24 by a connector 25. The connector 25, typically a tab or strip of metal, such as platinum, is connected to the target 24 and extends through the glass envelope 12 in a vacuum seal to make external electrical connections.

The interior surface 26 of the tubular anode electrode G3 is roughened by chemical etching or sandblasting in a manner well known in the art. This surface treatment provides the anode electrode G3 with light scattering properties so that light, entering the electrode G3 and striking the interior surface 26, is scattered by the roughened surface. The scattered light provides diffuse illumination of the inside surface of the target 24. This diffuse illumination produces an artificial dark current which tends to reduce build-up and decay lags experienced at low light levels.

Light is directed into the interior of the anode electrode G3 by means of a bifurcated, rod-shaped light conductor 28. The light conductor 28 is bent in such a way that a part of the light irradiated by the filament 20 is guided through a stem 30 of the conductor 28 and thence through two branches, 32 and 34. The branches 32 and 34 join at the stem 30 to form a crotch portion. The branches 32 and 34 are arranged to extend toward the target 24 and into the interior of the anode electrode G3 into which the light from the conductor 28 emanates as shown by the series of arrows in FIG. 1.

As so far described, the lead monoxide target pick-up tube is known, per se. In such prior art structures the limits within which the auxiliary light from the filament 20 can be controlled is considerably narrow since any variations in filament temperature is restricted to the operating temperature range of the cathode. Furthermore, standard, off-the-shelf conductors provide no means for controlling the transmitted light so that any variations in the target properties and light conductor conductivity can often result in undesirable deviations in bias dark current from tube to tube.

Figure 3:
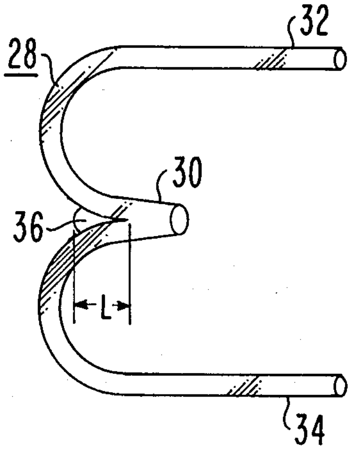
FIG. 3 is an enlarged perspective view of the bifurcated light pipe of FIG. 1 showing the modification made to the crotch portion of the pipe for controlling the light transmitted through the pipe.

According to the present, novel arrangement, the light conductor 28 is modified to control the light that is transmitted to the target 24 to provide more uniform bias lighting conditions and also to assure more consistent light transmission from tube to tube. This modification is particularly useful where a standard, off-the-shelf light conductor will provide a light intensity that is too high and a reduction to a selected light transmission level is needed to obtain a desirable dark current. It has been found in accordance with the present configuration, that the light transmission characteristics of the bifurcated light conductor 28 can be attenuated by structurally rearranging or modifying the crotch portion. This is preferably achieved by redistributing the glass around the crotch region, i.e., from portions of the stem 30 and branches 32 and 34, until the crotch is "closed" or filled in with a glass mass or body 36, as shown in detail in FIG. 3. This redistribution may be done by heating the crotch region to a suitable temperature by a gas/oxygen torch. Alternatively, the glass mass or body 36 may comprise an additional amount of glass that is suitably melted into the crotch region. It has also been determined that other novel modifications of the crotch region, such as roughening as by sandblasting or coating the crotch region with a reflective material, such as aluminum, will attenuate the light transmitted through the conductor 28.

In one specific example, a light pipe is formed into a W-shaped bifurcated rod of Pyrex (trade name) glass, the diameter of the branches 32 and 34 and of the stem 30 being approximately 2.0 mm. By redistributing the glass so that the crotch region is filled in with about 0.75 mm of glass, as measured according to the length, L, in FIG. 3, the light transmission is approximately 50% less than that of a similarly configured, standard pipe without its crotch modified. The attenuation of the light transmission can be controlled by the amount of additional glass moved into the crotch region. The more glass that is added, the more the light transmission is decreased.

In general, for particular pick-up tubes, a definite correlation can be made between the light transmission through a light conductor and the tube bias-light dark current. This is done by taking measurements of the dark current under various light intensities for a tube operating under normal conditions with light pipes of known transmission levels. The transmission levels are relatively determined by comparing the light intensities from a particular light pipe against that of a standard calibrated light pipe with a fixed light source. Thus, by knowing the transmission level of a light pipe prior to tube assembly, a determination can be made beforehand as to the bias-light dark current that will be produced. For example, a bias-light dark current of 4 nanoamperes will be obtained using a light pipe having a transmission level of 80% of that of the standard calibrated light pipe, while a dark current of 3 nanoamperes will be produced at a level of 70% transmission.

In accordance with the present method of making a light-controllable light conductor, a bifurcated light pipe is measured to determine its transmission level as hereinabove described. Where the intensity level will yield a light bias current that is too high, the crotch modification technique is utilized to reduce the light transmission. Typically, for lead monoxide target pick-up tubes, the light bias current should be kept less than about 10 nanoamperes. After adding a given amount of glass into the crotch portion, the transmission level is again measured to ascertain the change in transmission and the light bias dark current that can be expected.

Figure 2:
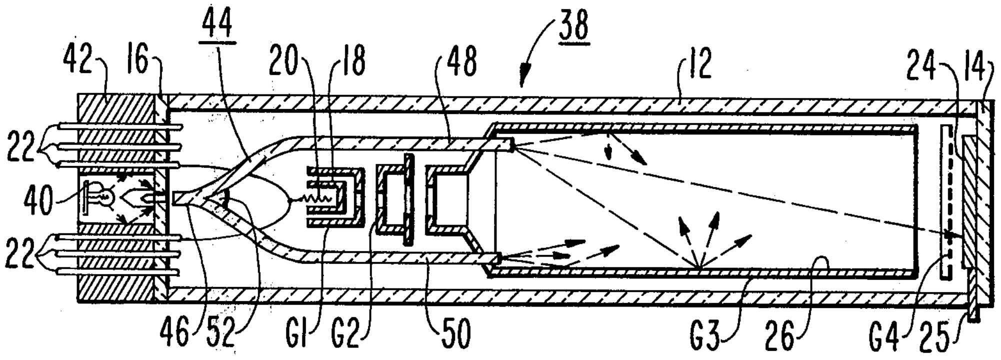

Although the light conductor 28 has been described in the form of a W-shaped rod, utilizing the tube filament 20 as the light source, other light conductor configurations may also be used. The tube 38 shown in FIG. 2 is essentially similar to that shown in FIG. 1, except for the arrangement of the light source and the configuration of the light conductor. In this case a light source 40, such as an incandescent lamp, is mounted in an end cap 42 external to the evacuated enclosed envelop 12. The lamp 40 may also be mounted within the enclosed envelop 12. A glass light conductor 44 is formed in the configuration of a bifurcated Y-shaped rod having a stem section 46 and two branches 48 and 50 which extend into the interior of anode electrode G3 at their free ends and which join at the stem 46 to define a crotch portion. The light from the source 40 passes through the glass base plate 16 where it is directed into the stem section 46, which is proximate to the source 40, and thence through the branches 48 and 50 to emanate into the interior of anode electrode G3 as described with reference to FIG. 1. The stem 46 may contact or be closely proximate to the bottom plate 16. Modification of the conductor 44, such as by filling in the crotch region with an additional body 52 of glass, is utilized to control the light transmission and hence the tube dark current in the same manner as the hereinbefore described light conductor 28 of FIG. 1.

Typically, the bifurcated rods described herein are substantially planar and are preferably formed of Pyrex (trade name) glass rods having a diameter in the range of 1 to 3 mm. Standard glass cane rods or a polymer such as methyl-methacrylate, commonly known as Plexiglas (trade name) may also be used in the practice of the invention. In addition, other multi-furcated and multi-planar conductors with crotch regions may also be utilized.

Although the target 24 described in the preferred embodiment comprises a layer of lead monoxide, other photoconductive materials such as, for example, selenium arsenic telluride, cadmium selenide and antimony trisulfide may also be employed.

What is claimed is:

1. In a pick-up tube having a photoconductive target electrode, a light source for illuminating said target electrode for biasing the dark current of said target electrode, and a light conductor for directing light from said light source through said conductor to said target electrode, said light conductor having a stem section and at least two branches defining a crotch region between two of said branches, the improvement wherein:

said light conductor includes means to eliminate the apex of the crotch angle by redistributing the glass mass at said apex to selectively attenuate the light transmitted through said conductor.

2. A tube according to claim 1, wherein said light conductor is a glass rod and wherein said eliminating means comprises a predetermined amount of glass disposed in said crotch region of said branched rod.

3. A tube according to claim 2, wherein said predetermined amount of glass comprises glass that is redistributed from portions of said stem section and branches into said crotch region.

4. A tube according to claim 2, wherein said predetermined amount of glass comprises glass that is added to said crotch region.

5. A tube according to claim 1, wherein said light source is disposed at one end of said tube opposite said target electrode, and wherein said light conductor is a bifurcated Y-shaped rod with stem section directed toward said light source.

6. A tube according to claim 1, wherein said light source is a filament disposed within said tube for heating a cathode for emitting electrons to strike said target electrode, and wherein said light conductor is a bifurcated W-shaped rod with said stem section directed toward said filament.

* * * * *